US006857186B2

(12) United States Patent
Lin et al.

(10) Patent No.: US 6,857,186 B2
(45) Date of Patent: Feb. 22, 2005

(54) METHOD OF MANUFACTURING A PIEZOELECTRIC PRINT-HEAD

(75) Inventors: Chen-Hua Lin, Yunlin Hsien (TW); Wen-Chung Lu, Kaohsiung (TW); Ming-Hsun Yang, Taipei (TW); Guey-Chyuan Chen, Taoyuan (TW); Chih-Chieh Hsu, Hsinchu (TW)

(73) Assignee: Nanodynamics, Inc., Hsinchu (TW)

( * ) Notice: Subject to any disclaimer, the term of this patent is extended or adjusted under 35 U.S.C. 154(b) by 103 days.

(21) Appl. No.: 10/249,939

(22) Filed: May 21, 2003

(65) Prior Publication Data

US 2003/0184619 A1 Oct. 2, 2003

Related U.S. Application Data

(62) Division of application No. 10/064,716, filed on Aug. 9, 2002, now Pat. No. 6,592,210.

(30) Foreign Application Priority Data

Sep. 6, 2001 (TW) .................................... 90122077 A

(51) Int. Cl.[7] .......................... B23P 17/00; B21D 53/76

(52) U.S. Cl. ....................... 29/890.1; 29/25.35; 29/830; 29/831; 29/832; 427/100; 216/27; 430/320

(58) Field of Search ............................ 29/25.35, 890.1, 29/830, 831, 832; 347/68, 71, 70, 72; 427/100, 123, 126.1; 216/27, 49, 41; 430/311, 320, 329

(56) References Cited

U.S. PATENT DOCUMENTS

| | | | | | |
|---|---|---|---|---|---|
| 5,612,724 | A | * | 3/1997 | Murakami et al. | 347/64 |
| 5,852,337 | A | * | 12/1998 | Takeuchi et al. | 310/328 |
| 5,933,167 | A | * | 8/1999 | Shimada et al. | 347/70 |
| 6,013,970 | A | * | 1/2000 | Nishiwaki et al. | 310/330 |
| 6,209,994 | B1 | * | 4/2001 | Furuhata et al. | 347/68 |

* cited by examiner

*Primary Examiner*—A. Dexter Tugbang
*Assistant Examiner*—Tai Nguyen
(74) *Attorney, Agent, or Firm*—Jiang Chyun IP Office

(57) ABSTRACT

A method of manufacturing a piezoelectric ink-jet print-head uses a metallic layer and a thick film layer with a slot hole therein instead of a ceramic vibration plate and an ink layer. The piezoelectric layer and the upper electrode layer are formed inside the ink cavity so that overall thickness of the print head is reduced. To form the ink-jet print head, a metallic layer and a lower electrode layer are sequentially formed over a substrate. A patterned piezoelectric layer and an upper electrode layer are sequentially formed over the lower electrode layer. A patterned thick film layer with a slot hole therein is formed over the metallic layer. The thick film layer and the metallic layer together form a cavity that encloses the piezoelectric layer and the upper electrode layer. A nozzle plate having a nozzle thereon is attached to the thick film layer. The nozzle plate, the thick film layer and the metallic layer together form an ink cavity. The hole in the nozzle is continuous with the ink cavity.

16 Claims, 5 Drawing Sheets

METHOD OF MANUFACTURING A PIEZOELECTRIC PRINT-HEAD

CROSS REFERENCE TO RELATED APPLICATIONS

This application is a divisional application of prior U.S. application Ser. No. 10/064,716, filed on Aug. 9, 2002 now U.S. Pat. No. 6,592,210.

BACKGROUND OF INVENTION

1. Field of Invention

The present invention relates to a piezoelectric printhead and its method of manufacture. More particularly, the present invention relates to a piezoelectric printhead that uses a metallic layer and a thick film layer with a slot hole therein instead of conventional ceramic material to form a vibration layer and an ink cavity layer structure.

2. Description of Related Art

In general, the operating mechanism of a conventional ink-jet printer can be classified into thermal bubble and piezoelectric. Thermal bubble ink-jet printing utilizes a heater to vaporize an ink drop quickly to form a high-pressure gaseous ink bubble so that the ink is suddenly ejected from an ink nozzle. Because thermal bubble print head is inexpensive to produce, they are mass-produced by commercial companies such as HP and Canon. However, the high-temperature vaporization mechanism needed to operate the printhead often limits the type of ink (mainly a water-soluble agent) that can be selected. Such limitations narrow its field of applications.

Piezoelectric printing utilizes the deformation of a block of piezoelectric ceramic material when a voltage is applied. Such deformation compresses liquid ink and creates a liquid jet out from an ink reservoir. Compared with a thermal bubble type of print head, a piezoelectric printhead has several advantages. Unlike a thermal bubble printhead that demands the ink to be vaporized at a high temperature and hence may change the color somewhat, the piezoelectric printhead has no such problem. Furthermore, the piezoelectric printhead operates without cyclic heating and cooling and hence may have a longer working life. Moreover, the piezoelectric ceramic material responds to a voltage quickly and hence may produce print documents a lot faster. The response of a thermal bubble printhead, on the other hand, is limited by the rapidity of heat conduction. Last but not least, the amount of deformation in the piezoelectric ceramic depends on the voltage of the electricity applied. In other words, by controlling the voltage applied to the piezoelectric ceramic, size of the ink droplet ejected from a nozzle may change. Ultimately, quality of the document produced by the piezoelectric printhead can be improved.

FIG. 1 is a schematic cross-sectional view of a conventional piezoelectric ink-jet print head. Ceramic green tapes for forming a conventional piezoelectric ink-jet print head 100 including an upper electrode layer 102, a piezoelectric layer 104, a lower electrode layer 106, a vibrating layer 108, an ink cavity layer 110 and an ink cavity bottom film layer 112 are manufactured in thick film processes. Thereafter, the green tapes are pressed together in the correct order and fired to form a ceramic structure such as the piezoelectric ink-jet printhead manufactured by EPSON.

To operate the piezoelectric printhead 100, a voltage is applied to the piezoelectric layer 104 through the upper electrode 102 and the lower electrode 106. Since the piezoelectric layer 104 is a piezoelectric ceramic material, the piezoelectric layer 104 will deform pushing the vibrating layer 108 and pressuring the ink inside the ink cavity 114. A portion of the pressurized ink ejects from an ink nozzle 116 and travels to a paper document to form a dot pattern.

In a conventional piezoelectric ink-jet printhead, aside from the metallic upper electrode and the lower electrode, other layers are separately formed in thick film ceramic processes and then combined together by pressure and high-temperature treatment. Consequently, a conventional piezoelectric ink-jet printhead has the following disadvantages: 1. Since the piezoelectric ink-jet printhead has a relatively small dimension but a relatively high precision, various thick ceramic films must be carefully aligned before being joined together. This may lead to a lowering of product yield. 2. Because the piezoelectric printhead has a relatively complicated structure, the ceramic material may shrink unevenly during a thermal treatment process leading to stress or structural damage. Again, this may lead to a drop in product yield. 3. The uneven shrinkage due to a high temperature treatment may also lead to a mismatch between delicate parts within the ink-jet printhead. This aspect of the production not only lowers product yield, but also decreases the packing density of ink-jet printheads leading to a lower print resolution.

SUMMARY OF INVENTION

Accordingly, one object of the present invention is to provide a method of forming a piezoelectric ink-jet printhead. The method uses an electroplating process to form a metallic layer instead of using ceramic material to form a vibration layer and uses film forming (roller coating), exposure and developing processes (photolithography) to form a thick film layer instead of using ceramic material to form an ink cavity layer. Hence, product yield and manufacturing precision are increased.

To achieve these and other advantages and in accordance with the purpose of the invention, as embodied and broadly described herein, the invention provides a piezoelectric ink-jet printhead. The piezoelectric printhead has a substrate with a metallic layer thereon. A lower electrode layer is formed over the metallic layer. A patterned piezoelectric layer is formed over the lower electrode layer. A patterned upper electrode layer is formed over the piezoelectric layer. A patterned thick film layer is formed over the metallic layer. The thick film layer includes at least a slot hole that passes through the thick film layer. The thick film layer and the metallic layer together form a cavity. The cavity encloses the upper electrode layer and the piezoelectric layer. A nozzle plate is formed over the thick film layer. The nozzle plate, the thick film layer and the metallic layer together form an ink cavity. The nozzle plate further includes a nozzle hole linked to the ink cavity. The piezoelectric ink-jet printhead further includes an inert layer between the lower electrode layer and the metallic layer. The inert layer is made from an inert metal or an insulating material.

This invention also provides a method of forming a piezoelectric ink-jet printhead. A substrate having a first and a second surface is provided. A metallic layer and a lower electrode layer are sequentially formed over the first surface of the substrate by electroplating. Thereafter, a patterned piezoelectric layer and an upper electrode layer are sequentially formed over the lower electrode layer by screen-printing. A patterned thick film layer is formed over the metallic layer by film forming (roller coating) and an exposure/development process. The thick film layer has at least a slot hole that passes through the thick film layer. The thick film layer and the metallic layer together form a cavity. The cavity encloses the upper electrode layer and the piezoelectric layer. A nozzle plate is attached to the thick film layer. The nozzle plate, the thick film layer and the metallic layer together form an ink cavity. The nozzle plate has a nozzle hole continuous with the ink cavity. After forming the metallic layer, an inert layer may also be formed over the metallic layer. The inert layer is made from an inert metal or an insulating material. In addition, a firing process may be performed after forming the piezoelectric layer.

In this invention, a metallic layer formed by electroplating replaces the conventional ceramic vibration layer. Since electroplating costs less than forming a ceramic thick film by compression, production cost of the print head is reduced.

This invention also uses exposure/development processes to form a slot hole in the thick film layer. The slot hole and the metallic layer together form a cavity and the thick film layer with a slot hole therein serves as an ink cavity layer for the ink-jet printhead. Because exposure/development processes are capable of producing a pattern with great accuracy, dimensions of the ink cavity can be precisely fabricated.

In addition, the piezoelectric layer and the upper electrode layer are enclosed within the ink cavity instead of outside the cavity so that overall thickness of the inkjet printhead is reduced. Hence, there is a volume reduction of the ink-jet printhead.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
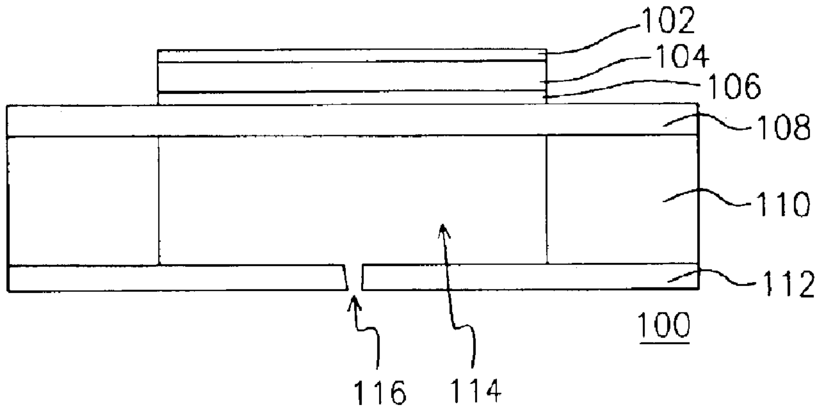
FIG. 1 (PRIOR ART)
FIG. 1 is a schematic cross-sectional view of a conventional piezoelectric ink-jet printhead.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
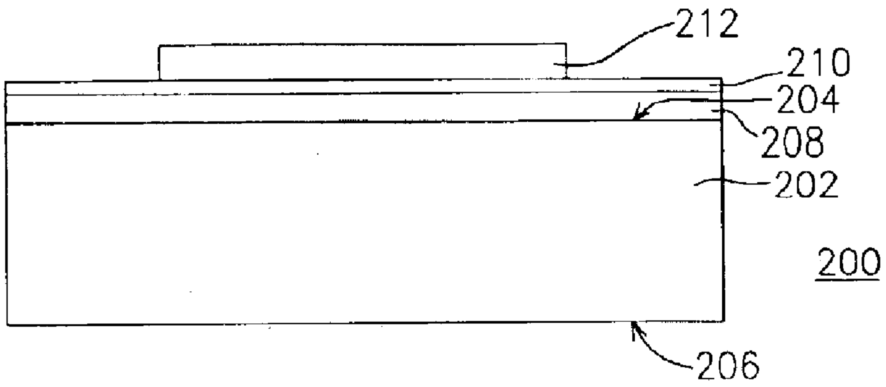
FIGS. 2A to 2D are schematic cross-sectional views showing the progression of steps for fabricating a piezoelectric ink-jet printhead according to one preferred embodiment of this invention.

FIGS. 2A to 2D are schematic cross-sectional views showing the progression of steps for fabricating a piezoelectric ink-jet printhead according to one preferred embodiment of this invention. As shown in FIG. 2A, a substrate 202 such as a silicon wafer is provided. The substrate 202 has a first surface 204 and a second surface 206. A metallic layer 208 is formed on the first surface 204 of the substrate 202 by electroplating. A lower electrode layer 210 is formed over the metallic layer 208, for example, by performing either an electroplating or a screen-printing process. A patterned piezoelectric layer 212 is formed over the lower electrode layer 210, for example, by performing a screen-printing process. Note that the piezoelectric layer 212 is formed using a piezoelectric ceramic material. Since the initial screen-printed piezoelectric material is a ceramic green tape, a high-temperature firing process needs to be performed to transform the green tape into the ceramic piezoelectric layer 212. Material constituting the piezoelectric layer 212 includes lead zirconate titanate (PZT) or piezoelectric polymers. Piezoelectric polymers include poly-vinylidene fluoride (PVDF).

Figure 2B:
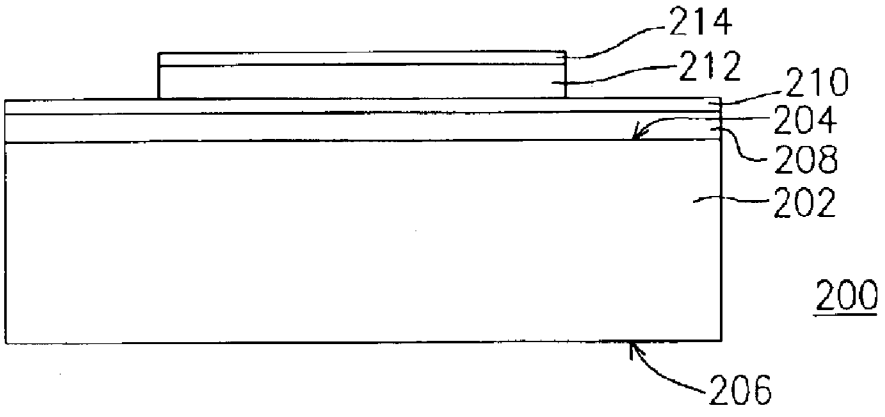

As shown in FIG. 2B, a patterned upper electrode layer 214 over the piezoelectric layer 212 is formed by performing a screen-printing process. The upper electrode 214 is positioned directly over the piezoelectric layer 212. Because the upper electrode layer 214 is formed after firing the piezoelectric layer 212, the material constituting the upper electrode layer 214 need not be a temperature resistant conductive substance. In fact, the upper electrode layer 214 can be a conductive layer having a melting point lower than the firing temperature.

Figure 2C:
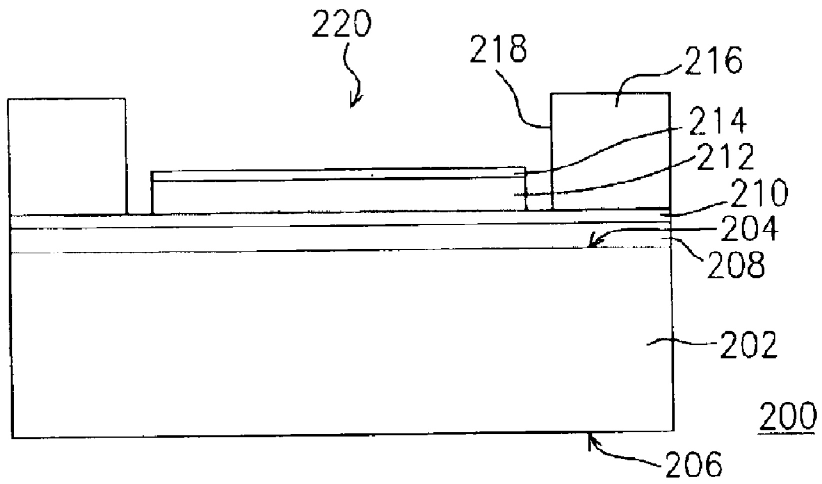

As shown in FIG. 2C, a patterned thick film layer 216 over the lower electrode layer 210 is formed by film forming (for example, roller coating) and photo-exposure/development processes. The thick film layer 216 has at least one slot hole 218 that passes through the thick film layer 216 and forms a cavity 220 together with the lower electrode layer 210. The cavity 220 encloses the upper electrode 214 and the piezoelectric layer 212. The thick film layer 216 is patterned, for example, by depositing thick film material globally over the lower electrode layer 210, the upper electrode layer 214 and the piezoelectric layer 212. Thereafter, a portion of the thick film is removed by performing photo-exposure/development processes to form the slot hole 218 that passes through the thick film layer 216.

The thick film material constituting the thick film layer 216 includes, for example, dry film photoresist, liquid photoresist, positive photoresist, negative photoresist, light sensitive polyimide or light sensitive epoxy polymers. The dry film photoresist may be directly attached to the substrate by heated roller coating. The liquid photoresist is a fluid light-sensitive polymer that can be formed over the lower electrode layer 210, the piezoelectric layer 212 and the upper electrode layer 214 by coating. Then, the liquid photoresist is hardened. Thereafter, the liquid photoresist is illuminated with an ultra-violet light source and chemically developed to produce the required pattern. If the piezoelectric layer 212 is made from piezoelectric ceramic material, a firing process needs to be performed as well. Because the thick film layer 216 is formed over the lower electrode 210 after the piezoelectric layer 212 is fired, there is no need to form the thick film layer 216 using a temperature resistant material.

Figure 2D:
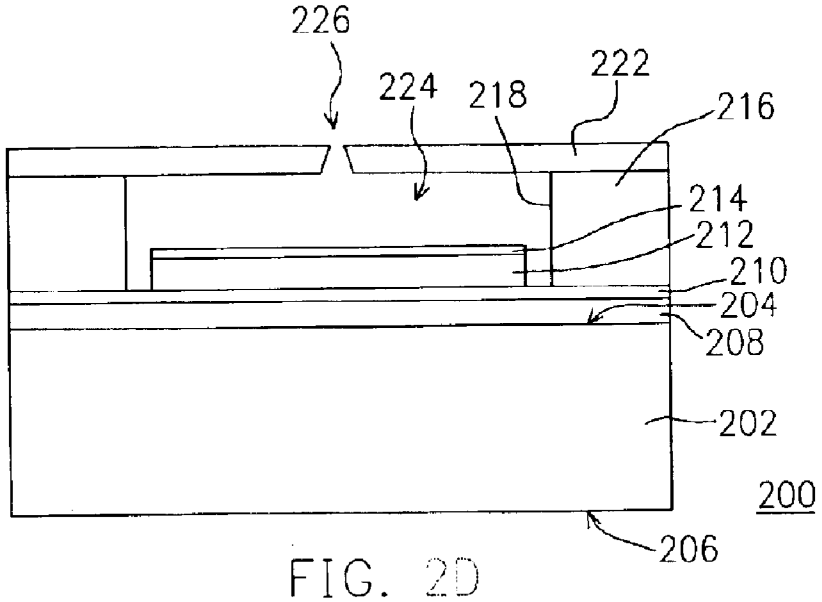

As shown in FIG. 2D, a nozzle plate 222 is attached to the upper surface of the thick film layer 216. The nozzle plate 222 encloses the cavity 220 in FIG. 2C. The nozzle plate 222 together with the thick film layer 216 and the lower electrode layer 210 form an ink reservoir 224. The nozzle plate 222 has at least one nozzle hole 226 that form a continuous passageway to the ink reservoir 224. The nozzle hole 226 serves as an outlet for the ink. Note that if the piezoelectric layer 212 is made from piezoelectric ceramic material, the nozzle plate 222 is attached to the thick film layer 216 only after the firing process. Hence, there is no need to fabricate the nozzle plate 222 using temperature resistant material. In other words, either a metallic or a polymeric material may be used to form the nozzle plate 222.

If the piezoelectric layer 212 is made from a ceramic piezoelectric material, a firing process must be performed to sinter the ceramic material together. To prevent the melting of the metallic layer 208, the metallic layer 208 is made from a material having a melting point greater than 800 Â° C. Furthermore, if the metallic layer 208 is an electroplated layer, residual stress within the metallic layer 208 may lead to structural damage to the ink-jet printhead. Hence, a metallic material having little residual stress but large extensile capacity after electroplating is preferably selected. Metallic elements belonging to this category include nickel (Ni), copper (Cu), palladium (Pd) or an alloy of these metals.

In addition, if the piezoelectric layer 212 is made from a ceramic piezoelectric material, a firing process must be performed. To prevent the metallic layer 208 and the piezoelectric layer 212 from reacting chemically with each other during the firing process, the lower electrode 210 can be fabricated using an inert metallic material. Similarly, to prevent the melting of the lower electrode layer 210 during the firing process, the lower electrode 210 must be fabricated using a material having a melting point greater than 800 Â° C. Hence, material constituting the lower electrode 210 may include, for example, gold, silver, copper, platinum, palladium, an alloy of the aforementioned metals or some other conductive materials.

Figure 3:
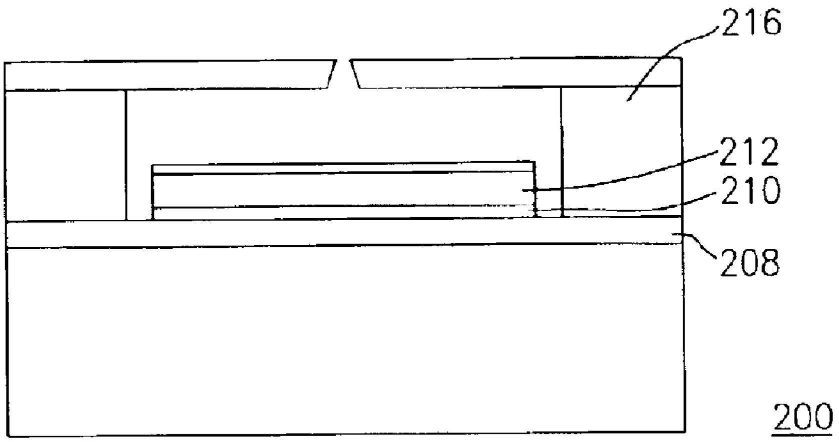
FIG. 3 is a schematic cross-sectional view of an alternative piezoelectric ink-jet printhead according to one preferred embodiment of this invention.

FIG. 3 is a schematic cross-sectional view of an alternative piezoelectric ink-jet printhead according to one preferred embodiment of this invention. The principle difference from the one in FIG. 2D is that the lower electrode 210 is patterned to fit the piezoelectric layer 212 so that the thick film layer 216 sits directly on top of the metallic layer 208.

Figure 4:
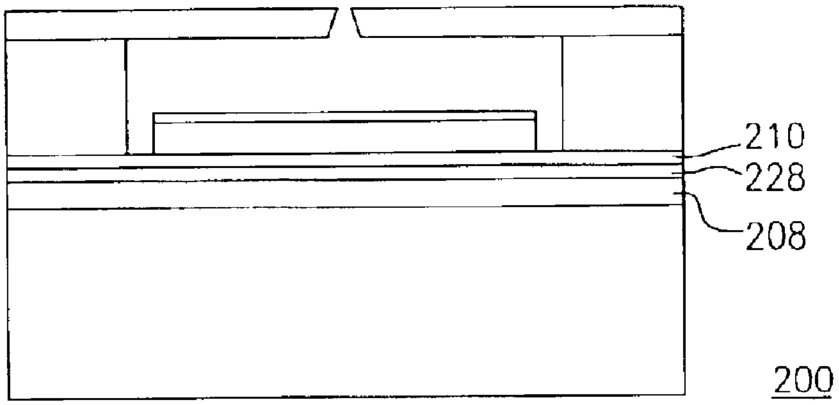
FIG. 4 is a schematic cross-section view of a piezoelectric ink-jet printhead having an inert layer therein according to one preferred embodiment of this invention.

FIG. 4 is a schematic cross-section view of a piezoelectric ink-jet print head having an inert layer therein according to one preferred embodiment of this invention. To prevent the piezoelectric layer 212 from penetrating through the lower electrode layer 210 and reacting with the metallic layer 208 during the high temperature firing process, an inert layer 228 is formed between the lower electrode layer 210 and the metallic layer 208. The inert layer 228 is formed from an inert metallic material selected from a group including, for example, gold, silver, copper, palladium and other metallic alloys. The inert layer 228 may also include some insulating material selected from a group including silicon nitride, silicon oxide and tantalum oxide, for example.

Figure 5:
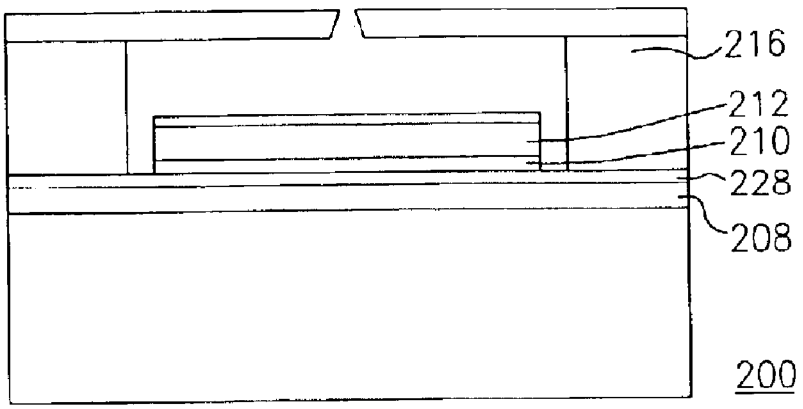
FIG. 5 is a schematic cross-section view of an alternative piezoelectric ink-jet printhead having an inert layer therein according to one preferred embodiment of this invention.

FIG. 5 is a schematic cross-section view of an alternative piezoelectric ink-jet printhead having an inert layer therein according to one preferred embodiment of this invention. The principle difference from the one in FIG. 4 is that the lower electrode 210 is patterned to fit the piezoelectric layer 212 so that the thick film layer 216 sits directly on top of the inert layer 228.

Figure 6:
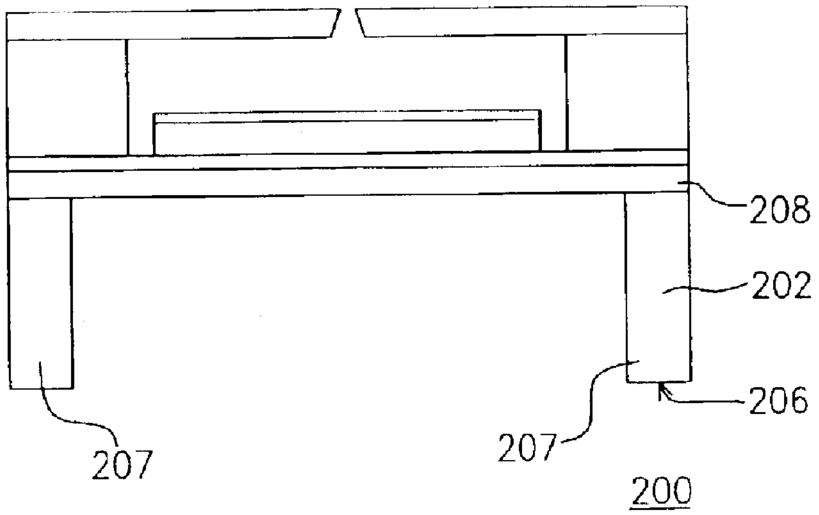
FIG. 6 is a schematic cross-sectional view of a piezoelectric ink-jet printhead having a positioning frame thereon according to one preferred embodiment of this invention.

FIG. 6 is a schematic cross-sectional view of a piezoelectric ink-jet printhead having a positioning frame thereon according to one preferred embodiment of this invention. In general, a plurality of ink-jet printheads is assembled together so that they are simultaneously activated in actual printing. In this invention, after various ink-jet components are manufactured, sand blasting or photolithography/etching process or sand blasting followed by photolithography/etching are carried out to remove a portion of the material at the second surface 206 of the substrate 202. Hence, a positioning frame 207 for mounting the assembly onto an ink cartridge is formed on the backside around the edge of the metallic layer 208 of each ink-jet printhead 200.

One major aspect of this invention is the replacement of the ceramic vibration layer with a metallic layer formed by electroplating. Furthermore, a film forming and photo-exposure/development method is used to form a thick film layer having a slot hole therein. The slot hole and the metallic layer together form a cavity so that the thick film layer may serve as an ink cavity layer of the ink-jet printhead. Since electroplating and photo-exposure/development are capable of producing very accurate dimensions, the ink cavity is formed with great precision and high yield.

In this invention, the metallic layer, the lower electrode layer and the thick film layer with a slot hole therein are formed by performing electroplating, film forming and photo-exposure/development processes. Since the precision of such processes is superior to the conventional ceramic thick film pressing and high-temperature firing processes, overall integration of the ink cavity is improved.

Another aspect of this invention is the selection of an inert metallic material to form the lower electrode layer. This prevents chemical reaction between the metallic layer and the piezoelectric layer due to high temperature firing that may lead to a change in the piezoelectric property.

An inert layer may also be formed between the lower electrode layer and the metallic layer to prevent the piezoelectric layer from penetrating through the lower electrode layer, thereby reacting chemically with the metallic layer and altering the piezoelectric effect of the piezoelectric layer.

In addition, the piezoelectric layer is formed inside the ink cavity instead of outside. Hence, thickness and hence overall volume of the ink-jet print head is reduced.

In conclusion, the piezoelectric ink-jet print head has the following advantages: 1. In this invention, a metallic layer formed by electroplating replaces the conventional ceramic vibration layer. Since metal has a higher heat conductive capacity and extensibility than ceramic, damage due residual stress after the firing of ceramic material is eliminated. Moreover, electroplating costs less than forming a ceramic thick film by compression. 2. In the manufacturing of the ink-jet printhead, the metallic layer, the lower electrode layer and the thick film layer with a slot hole therein are formed by performing electroplating, film forming and photo-exposure/development operations. Thereafter, a nozzle plate is placed over the thick film layer to form an ink cavity. Since the precision of such proeceaa is superior to the conventional ceramic thick film pressing and high-temperature firing processes, overall resolution of the ink-jet printing operation is improved. 3. The piezoelectric layer and the upper electrode layer are enclosed within the ink cavity instead of outside the cavity so that overall thickness of the ink-jet printhead is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating a piezoelectric ink-jet print head, comprising the steps of:

providing a substrate;

forming a metallic layer over the substrate;

forming a lower electrode layer over the metallic layer;

forming a patterned piezoelectric layer over the lower electrode layer;

forming a patterned upper electrode layer over the piezoelectric layer;

forming a patterned thick film layer over the metallic layer, wherein the thick film layer has at least a slot hole that passes through the thick film layer and forms a cavity with the metallic layer, and the cavity encloses the upper electrode layer and the piezoelectric layer; and attaching a nozzle plate to the thick film layer, wherein the nozzle plate, the thick film layer and the metallic layer together form an ink cavity, and the nozzle plate has at least a nozzle continuous with the ink cavity.

2. The method of claim 1, wherein after the step of forming the piezoelectric layer, further includes firing the piezoelectric layer.

3. The method of claim 1, wherein the substrate includes a silicon wafer.

4. The method of claim 1, wherein after the step of attaching a nozzle plate to the thick film layer further includes removing a portion of the substrate to form a position frame.

5. The method of claim 4, wherein the step of removing a portion of the substrate includes sandblasting and/or performing photolithography and etching processes.

6. The method of claim 1, wherein the step of forming the metallic layer includes electroplating.

7. The method of claim 1, wherein material constituting the metallic layer is selected from the group consisting of nickel, copper, palladium and an alloy of various combinations of the metals.

8. The method of claim 1, wherein the step of forming the lower electrode includes electroplating or screen printing.

9. The method of claim 1, wherein after forming the metallic layer, further includes forming an inert layer over the metallic layer.

10. The method of claim 9, wherein material constituting the inert layer is selected from the group consisting of gold, silver, copper, platinum, palladium and an alloy of various combinations of the metals.

11. The method of claim 9, wherein material constituting the inert layer is selected from a group consisting of silicon nitride, silicon oxide and tantalum oxide.

12. The method of claim 1, wherein the step of forming the piezoelectric layer includes screen-printing.

13. The method of claim 1, wherein material constituting the piezoelectric layer includes lead zirconate titanate (PZT) or poly-vinylidene fluoride (PVDF).

14. The method of claim 1, wherein the step of forming the upper electrode layer includes screen-printing.

15. The method of claim 1, wherein material constituting the thick film layer is selected from a group consisting of dry film photoresist, liquid photoresist, positive photoresist, negative photoresist, light-sensitive polyimide and light-sensitive epoxy.

16. The method of claim 1, wherein the step of forming the patterned thick film layer includes performing photolithography and development processes.

* * * * *